(12) United States Patent
Benz et al.

(10) Patent No.: US 6,398,448 B1
(45) Date of Patent: Jun. 4, 2002

(54) MOUNTING ELEMENT

(75) Inventors: Albrecht Benz, Leinfelden; Joerg Walther, Korntal; Torsten Buenning, Stuttgart; Frank Rahnfeld, Reichelsheim; Olaf Kelmd, Markgroeningen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/529,772

(22) PCT Filed: Jul. 31, 1999

(86) PCT No.: PCT/DE99/02363

§ 371 (c)(1),
(2), (4) Date: Jun. 2, 2000

(87) PCT Pub. No.: WO00/11396

PCT Pub. Date: Mar. 2, 2000

(30) Foreign Application Priority Data

Aug. 21, 1998 (DE) .......................................... 198 37 976

(51) Int. Cl.⁷ ................................................. E04F 13/06
(52) U.S. Cl. ........................ 403/205; 403/403; 403/231
(58) Field of Search ................................ 403/401, 402, 403/403, 205, 231, 10, 375; 52/288.1, 656.1, 656.9

(56) References Cited

U.S. PATENT DOCUMENTS

| | | | | | |
|---|---|---|---|---|---|
| 3,797,194 A | * | 3/1974 | Ekstein | ...................... | 52/656 X |
| 4,104,839 A | * | 8/1978 | Balzer et al. | .............. | 52/288.1 |
| 4,161,853 A | * | 7/1979 | Weiss et al. | ............... | 52/288.1 |
| 4,258,515 A | * | 3/1981 | Owen | .......................... | 52/105 |
| 4,385,850 A | * | 5/1983 | Bobath | ....................... | 403/205 |
| 4,430,833 A | * | 2/1984 | Balzer et al. | .................. | 52/255 |
| 4,862,612 A | * | 9/1989 | Sugihara et al. | .............. | 40/155 |
| 5,048,144 A | * | 9/1991 | Andrews | ...................... | 15/184 |
| 5,694,695 A | * | 12/1997 | Lund | ......................... | 30/296.1 |

FOREIGN PATENT DOCUMENTS

| | | |
|---|---|---|
| DE | 90 11 138 U | 11/1991 |
| DE | 297 18 526 U | 12/1997 |

* cited by examiner

*Primary Examiner*—Lynne H. Browne
*Assistant Examiner*—John R. Cottingham
(74) *Attorney, Agent, or Firm*—Michael J. Striker

(57) ABSTRACT

A mounting element (12, 12a, 12b) for securing components, in particular profile bars, and a cap (14, 14a, 14b) for covering the mounting element (12, 12a, 12b) are provided. Indentations (31, 39) are provided in lateral ribs (22, 36) of the mounting element (12, 12a, 12b) and/or of the cap (14, 14a, 14b). This makes the grip better and/or facilitates aligning the mounting element (12, 12a, 12b) and/or the cap (14, 14a, 14b).

14 Claims, 3 Drawing Sheets

MOUNTING ELEMENT

PRIOR ART

The invention is based on a mounting element as generically defined by the preamble to the main claim. One such mounting element is known from German Utility Model DE-GM 90 11 138.9, for instance. Break-off tongues are embodied on this mounting element in such a way that they widen toward the joining faces. The widths are dimensioned such that the break-off tongues have some play when positioned against a component with a recess, such as a profile bar with a mounting groove, while once the component has been introduced all the way, they have a press fit. Since the surfaces of the mounting element are smooth and can therefore be somewhat slippery, it can be difficult upon disassembly, particularly because of the press fit of the break-off tongues, to remove the mounting element again.

Furthermore, unless a certain alignment is adhered to, the mounting element can be secured only when the break-off tongues of the mounting element are arranged symmetrically. If they are not, then it can happen that the mounting element, if installed with a different orientation, will have to be repositioned.

ADVANTAGES OF THE INVENTION

The mounting element according to the invention having the characteristics of the body of the main claim has the advantage over the prior art that the mounting element can be better grasped with the hands because of indentations in the ribs. With a unilateral embodiment of indentations on the mounting element, simple alignment of the mounting element is moreover assured. The indentations are easy to make, since no special slides are needed for this purpose on the diecasting tool for the mounting element. If the indentations are embodied in a cover cap as well, then the cap can easily be aligned, especially given a unilateral embodiment. Markings can also be made in the indentations, without protruding past them.

By means of the provisions and characteristics recited in the dependent claims, particular refinements of the mounting element defined by main claim are described.

DRAWING

One exemplary embodiment of the invention is shown in the drawing and described in further detail in the ensuing description.

DESCRIPTION OF THE EXEMPLARY EMBODIMENT

Figure 1:
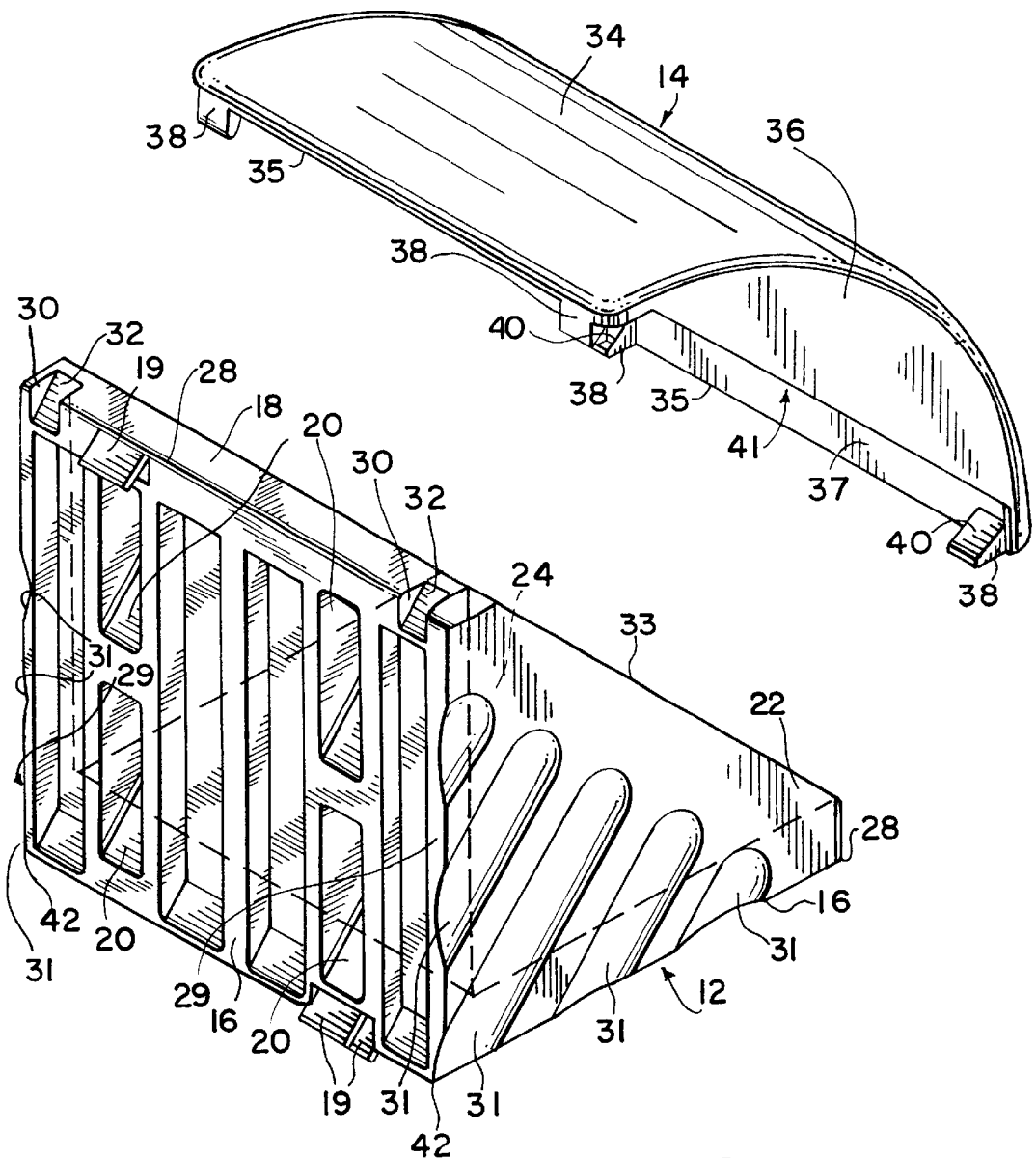
FIG. 1 shows an exploded perspective view of a mounting element with five indentations and one cap, as a first exemplary embodiment.

A mounting element 12 shown in FIG. 1 is used to secure components with recesses, in particular profile bars with mounting grooves, which are not shown in the drawing. The mounting element 12 serves as an angle fastener. With the mounting element 12 shown in FIG. 1, two components can be joined together at a right angle.

The mounting element 12 has joining faces 16 for the components to be joined; these joining faces are embodied on two walls 18 that are preferably at a right angle to one another. Protruding from each joining face 16 is one or more break-off tongue, in the case of FIG. 1 two break-off tongues 19 disposed obliquely, for instance, which can be brought into engagement with recesses in the components and thus form a means of securing against relative rotation. Openings 20 through which fastening elements, such as screws, for the components can be passed are embodied in each wall 18. In addition, in the present exemplary embodiment, two lateral ribs 22 for increasing the mechanical strength of the mounting element 12 are present between the walls 18, but because of the perspective view only one of these ribs is visible. The walls 18 and the ribs 22 form a recess 24, which is suggested in FIG. 1 by dashed lines.

On two edges 28, pointing away from one another, of the joining faces 16, two recesses 30 per edge 28 are embodied, and the recesses have mounting faces 32. Thus a total of four recesses are present in the exemplary embodiment shown. However, it is also possible to provide only one recess 30, or more than two recesses, per edge 28.

As can also be seen from FIG. 1, advantageously five indentations 31 are provided in both lateral ribs 22; these indentations originate at peripheral regions 29 of the joining faces 16, the peripheral regions bordering on the lateral ribs 22. Indentations 31 provide an especially good grip. To that end, the size of the indentations 31 should ideally be dimensioned such that they can be grasped well with the fingers. The indentations 31 preferably extend parallel to one another and are moreover located parallel to the bisector of an angle formed by the joining faces 16 or the walls 18. Of the five indentations 31, advantageously the middle one begins at the sectional region 42 formed by the peripheral regions 29 of the joining faces 16. It is also possible to provide five indentations 31 in only one lateral rib 22, or to provide more or fewer than five indentations 31. In the present exemplary embodiment, the indentations 31 have the cross-sectional area of a segment of a circle, and on the sides remote from the joining faces 16, they end in the form of a segment of a sphere; that is, in this region, the edges formed by the indentations 31 and the ribs 22 have the form of a semicircle. It is also possible for the indentations 31 to have a polygonal cross-sectional area. The five indentations 31 and at a line that extends parallel to the end faces 33 of the ribs 22. However, it is also possible to provide indentations 31 that do not end at such a line. In any case, in at least lateral rib 22 of the mounting element 12, at least one indentation 31 should be provided that originates at at least one peripheral region 29, adjoining the at least one lateral rib 22, of at least joining face 16.

For covering the recess 24 of the mounting element 12, a cap 14 is used, which has a curved, arched cover part 34 and two lateral ribs 36, which reinforce the cap 14. The cap 14 is advantageously embodied as a plastic injection molded part and is elastic but nevertheless very stable. The outer spacing of the ribs 36 of the cap 14 corresponds to the outer spacing of the ribs 22 of the mounting element 12. In a mounting element 12 that has only one lateral rib 22, the rib 36 of the cap 14, which is located on the side without a rib 22, is shaped in such a way that it rests on the walls 18. In a mounting element 12 without ribs 22, both ribs 36 of the cap 14 are shaped in this way. Once the cap 14 is mounted on the mounting element 12, a contour of a side view is substantially equivalent to a quarter circle. This advantageously creates a large space which offers enough room for fastening means. However, it is also possible to provide a cap 14 with a cover part 34 that is not curved but instead is shaped differently, for instance in such a way that the mounting element 12 and the mounted cap 14 are substantially parallelepiped, i.e., block-shaped. It is also possible to make the cap 14 flat, or in other words for it rest flat with one face on the ribs 22 of the mounting element 12.

On opposed edges 35, pointing away from one another, of the cover part 34, two extensions 38 are provided per edge 35, and the extensions have mounting faces 40. The extensions 38 are small and compact, and they are therefore nonflexible relative to the cover part 34. There are as many extensions 38 as there are recesses 30. The extensions 38 are embodied in such a way that they cooperate by positive engagement with the recesses 30. The spacing of the recesses 30 is advantageously greater than the spacing of the extensions 38. The extensions 38 or mounting faces 40 have a width that is dimensioned such that they fit with some play into the recesses 30.

Figure 2:
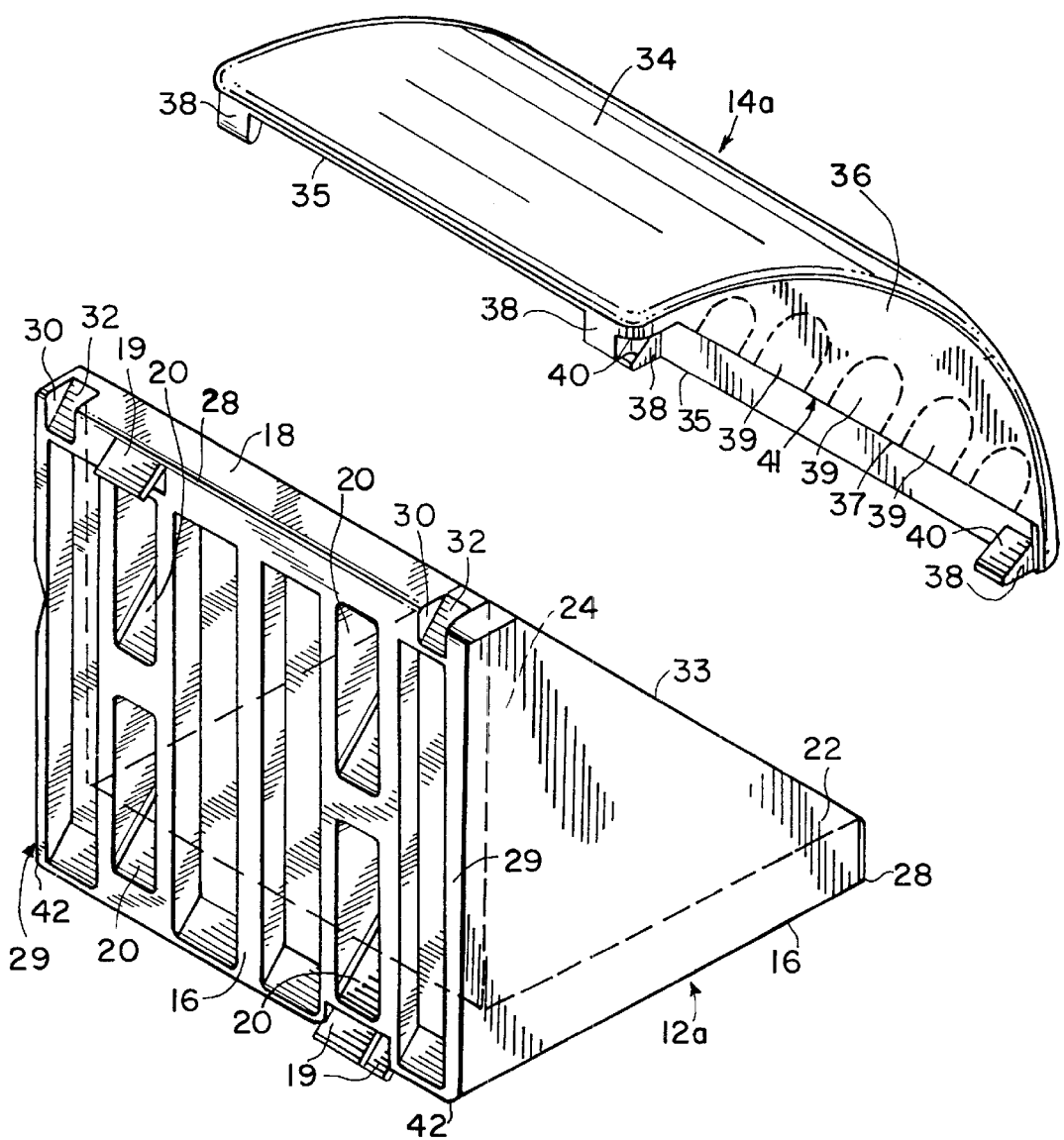
FIG. 2 shows an exploded perspective view of a modified mounting element and a modified cap with five indentations.

As seen from FIG. 2, indentations 39 can be provided in the lateral ribs 36 of the cap 14a. In the present exemplary embodiment, these indentations are five in number, but more or fewer indentations are also possible. The mounting element 12a here has no indentations 31. This is possible for example when the mounting element 12a has break-off tongues 19 that are arranged in such a way that no special alignment of the mounting element 12a is required, if the break-off tongues 19 are dimensioned such that after assembly they do not have a press fit, or if no break-off tongues 19 whatever are present. The indentations 39 provided solely on the cap 14a then, as already noted, make a better grip of the cap 14a possible. The indentations 39 originate at peripheral regions 41, adjoining the ribs 36, of the end faces 37 of the ribs 36. In the exemplary embodiment shown, the indentations 39 do not end at a line that extends parallel to the end faces 37 of the ribs 36. However, they can also end on a line that does extend parallel to the end faces 37 of the ribs 36.

Figure 3:
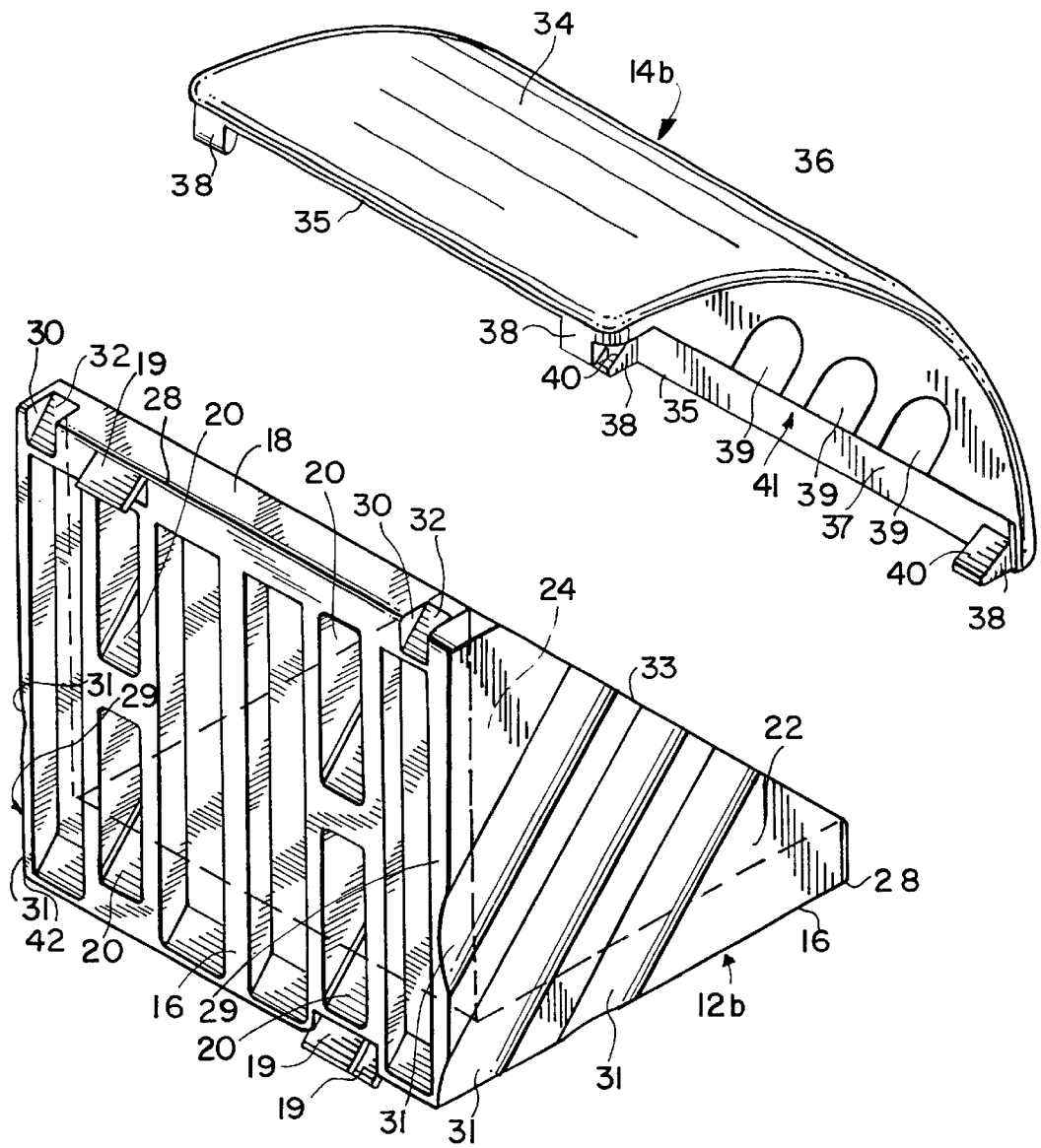
FIG. 3 shows an exploded perspective view of a modified mounting element and a modified cap with three indentations each.

As seen from the lines in FIG. 3, three indentations 39 can be provided in the lateral ribs 36 of the cap 14b; this corresponds to the number of indentations 31 in the mounting element 12b. This number is especially advantageous with relatively small mounting elements 12a and caps 14a, since the size of the indentations 31 that makes the indentations 31 easy to grasp with the fingers can be kept the same. The indentations 39 originate at the peripheral regions 41, adjoining the ribs 36, of the end faces 37 of the ribs 36; in the present example, the indentations 39 of the cap 14a are aligned with those of the mounting element 12a. In the exemplary embodiment shown, the indentations 39 end at a line that extends parallel to the end faces 37 of the ribs 36. The indentations 31 of the mounting element 12b in this case extend continuously as far as the end faces 37 of the ribs 22.

If the indentations 31 of the mounting element 12, 12a, 12b are embodied on only one lateral rib 22, and if the break-off tongues 19 of the mounting element 12, 12a, 12b are disposed asymmetrically, then the indentations 31 make it easier to align the mounting element 12, 12a, 12b. In a unilateral embodiment on both the mounting element 12, 12a, 12b and on the cap 14, 14a, 14b, this is equally applicable. Furthermore, the mounting element 12, 12a, 12b and the cap 14, 14a, 14b can be better grasped by means of the respective indentations 31 and 39. This effect is enhanced, especially when the indentations 31, 39 are embodied on both ribs 22 of the mounting element 12, 12a, 12b and on both ribs 36 of the cap 14, 14a, 14b. It is also possible to embody different numbers of indentations 31 and 39 on the respective ribs 22, 36, such as one indentation 31, 39 on one side and five indentations 31, 39 on the other side.

This provides a good grip and orientation. At the least, however, at least one indentation 39 should be provided in at least one lateral rib 36 of the cap 14, 14a, 14b, this indentation originating at the peripheral region 41, adjoining the rib 36, of the end face 37 of the rib 36.

In the mounting of the cap 14, 14a, 14b onto the mounting element 12, 12a, 12b, the latter already being firmly screwed to components, the extensions 38 of one edge 35 of the cover part 34 of the cap 14, 14a, 14b are for instance inserted first into the recesses 30 of one edge 28 of the mounting element 12, 12a, 12b. Then, the cap 14, 14a, 14b is pressed against the end faces 33 of the ribs 22 of the mounting element 12, 12a, 12b. As a result, the cap 14, 14a, 14b bends upwards, and the extensions 38 of the other edge 35 of the cover part 34 of the cap 14, 14a, 14b engage the recesses 30 of the mounting element 12, 12a, 12b. The opposed mounting faces 32 of the mounting element 12, 12a, 12b extend obliquely, instead of parallel, thus producing an undercut. The mounting faces 40 of the cap 14, 14a, 14b likewise extend obliquely, so that the cap 14, 14a, 14b fits over the mounting element with positive engagement, with the aid of the mounting faces 40. Since the spacing of the mounting faces 32 of the recesses 30 is greater than the spacing of the mounting faces 40 of the extensions 38, the cap 14, 14a, 14b holds especially firmly to the mounting element 12, 12a, 12b, thereby assuring a more-secure hold of the cap 14, 14a, 14b to the mounting element 12, 12a, 12b.

The recesses 30 need not necessarily be embodied on edges 28 of the joining faces 16. It is also possible to provide them on other edges, for instance on the edges of the ribs 22. In that case, the extensions 38 must be disposed fittingly on the cap 14, 14a, 14b. Embodying the recesses 30 and the extensions 38 on the edges 28 and 35 makes it possible for the extensions 38 to be very small. Since the extensions 38 are small and compact compared with the cap 14, 14a, 14b, they are less flexible than the cap 14, 14a, 14b and do not warp upon assembly and disassembly. In assembly and disassembly, it is accordingly only the cap 14, 14a, 14b or the cover part 34 that deforms, but not the extensions 38. This eliminates the risk that the extensions 38 will break off during assembly and disassembly from frequent flexing.

What is claimed is:

1. A mounting element (12) for securing profiled bars with mounting grooves, comprising:

walls (18) having joining faces (16), wherein an angle is formed between said walls and wherein said walls (18) are connected to one another by at least one lateral rib (22), wherein at least one indentation (31) is provided in at least one of said at least one lateral rib (22), said at least one indentation originating at at least one peripheral region (29) of at least one joining face (16), the peripheral region bordering on the at least one lateral rib (22), wherein said at least one indentation (31) extends parallel to a bisector of an angle formed by said joining faces.

2. A mounting element (12a), comprising:

walls (18) having joining faces (16);

a cap (14a) having at least one lateral rib (36), wherein at least one indentation (39) is provided in at least one of the at least one lateral rib (36), said at least one indentation originating at at least one peripheral region (41) of an end face (37) of the at least one lateral rib (36).

3. A mounting element (12), comprising.

walls (18) having joining faces (16), wherein at least one first lateral rib (22) is provided between said walls;

a cap (14b) having at least one second lateral rib (36), wherein at least one indentation is provided in said at least one first lateral rib (22), wherein said at least one indentation originates at at least one peripheral region (29) of at least one joining face (16), the peripheral region bordering on the at least one first lateral rib (22), and wherein in said at least one second lateral rib (36) of the cap (14a), at least one indentation (39) is provided, said at least one indentation originating at at least one peripheral region (41) of an end face (37) of the at least one second lateral rib (36), and wherein at least one of said at least one indentation (31) of the mounting element (14b) is aligned with at least one of said at least one indentation (39) of the cap (14b).

4. The mounting element (12, 12a, 12b) of claim 1, wherein the at least one indentation (31, 39) has a cross-sectional area of a segment of a circle.

5. The mounting element (12, 12a, 12b) of claim 1, wherein the at least one indentation (31, 39) has a polygonal cross-sectional area.

6. The mounting element (12, 12a, 12b) of claim 1, wherein a plurality of indentations (31, 39) are provided in each of said at least one lateral rib (22, 36), said indentations extending parallel to one another.

7. The mounting element (12, 12a, 12b) of claim 6, wherein, of the plurality of indentations (31), a middle one originates at a sectional region (42) formed by the peripheral regions (29) of the joining faces (16).

8. The mounting element (12) of claim 1, wherein five indentations (31, 39) are provided in each of said at least one lateral rib (22, 36).

9. The mounting element (12) of claim 1, wherein three indentations (31, 39) are provided in each of said at least one lateral rib (22, 36).

10. The mounting element (12, 12a, 12b) of claim 1, wherein indentation (31, 39) are provided that terminate at a line extending parallel to end faces (33, 37) of the at least one lateral rib (22, 36).

11. The mounting element (12,12a, 12b) of claim 1, wherein indentation (31, 39) are provided that do not terminate at a line extending parallel to end faces (33, 37) of the at least one lateral rib (22, 36).

12. The mounting element (12, 12a, 12b) of claim 1, wherein at least two opposed recesses (30) are formed on the mounting element (12, 12a, 12b), said at least two opposed recesses (30) having a first spacing, wherein at least two opposed extensions (38) are provided on a cap (14, 14a, 14b), said at least two opposed extensions having a second spacing and cooperating with the at least two opposed recesses (30), wherein the first spacing is greater than the second spacing, wherein the cap (14, 14a, 14b) is elastic, and the at least two opposed extensions (38) are nonflexible relative to the cap (14, 14a, 14b), and wherein the cap (14, 14a, 14b) fits over the mounting element (12, 12a, 12b) with the aid of the at least two opposed extensions (38).

13. The mounting element (12, 12a, 12b) of claim 12, wherein the at least two opposed recesses (30) are positioned on edges (28), pointing away from one another, of the joining faces (16).

14. The mounting element (12, 12a, 12b) of claim 1, further comprising a cap (14, 14a, 14b) for covering a recess of the mounting element (12, 12a, 12b), wherein a contour of a side view of said mounting element with a mounted cap (14, 14a, 14b) is substantially equivalent to a quarter circle.

* * * * *